C. F. JENKINS.
REPAIR DEVICE FOR PNEUMATIC TIRES.
APPLICATION FILED DEC. 16, 1914.
1,290,566.
Patented Jan. 7, 1919.
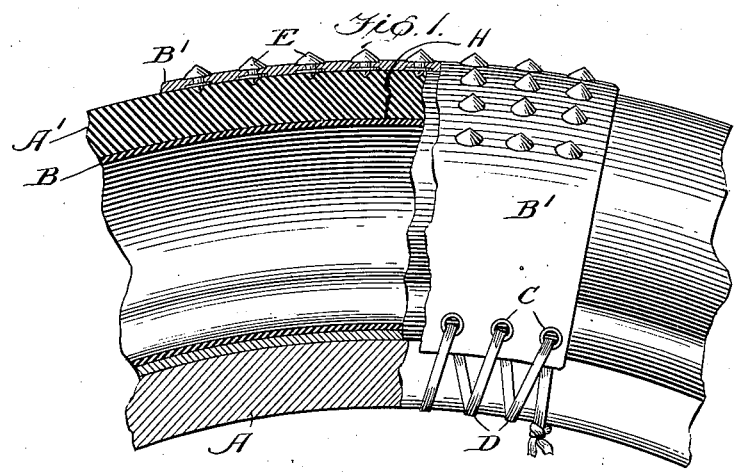
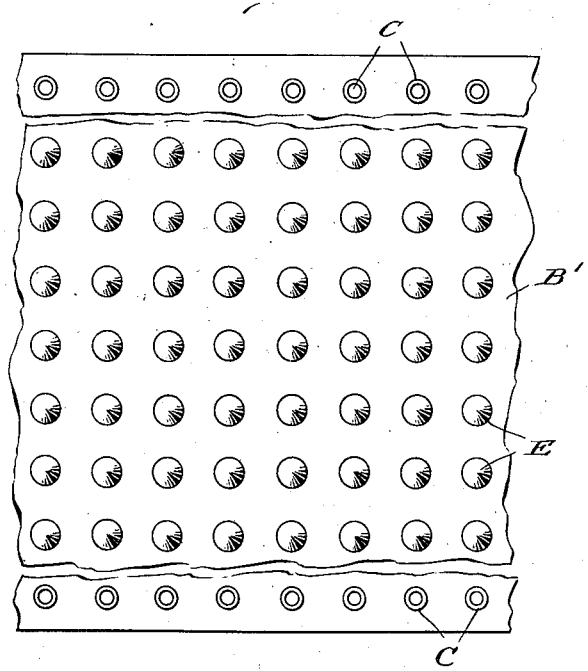
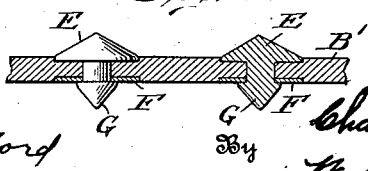

UNITED STATES PATENT OFFICE.

CHARLES FRANCIS JENKINS, OF WASHINGTON, DISTRICT OF COLUMBIA.

REPAIR DEVICE FOR PNEUMATIC TIRES.

1,290,566.     Specification of Letters Patent.     Patented Jan. 7, 1919.

Application filed December 16, 1914. Serial No. 877,589.

*To all whom it may concern:*

Be it known that I, CHARLES FRANCIS JENKINS, a citizen of the United States, residing at Washington, in the District of Columbia, have invented certain new and useful Improvements in Repair Devices for Pneumatic Tires, of which the following is a specification, reference being had therein to the accompanying drawing.

This invention relates to devices for permanently repairing cuts or punctures in pneumatic tires or in the casings of pneumatic tires. Cuts and punctures have been repaired by binding a pliable sheet such as leather or rubber and canvas, for examples, over the point of injury, usually by lacing passing around the wheel rim. Such expedients are unsatisfactory for various reasons. Such a sheet is quickly worn; the tire or casing crawls within it opening a cut which should be left closed; and most important of all, the sheet gradually slips bodily upon the tire or casing bringing most of the very great strain or pull at one margin of the laced part of the sheet tearing it at this point.

The principal object of this invention is to produce a convenient, effective, durable and inexpensive device which when applied to the outside of a tire or casing will avoid the evils suggested.

In the accompanying drawings,

Figure 1 shows partly in central longitudinal section a portion of a rim and tire provided with my devices.

Fig. 2 is a plan view showing the exterior of a pliable non-metallic sheet applied to the tire.

Fig. 3 is an enlarged sectional view of a small portion of such a sheet.

In these figures, A represents a wheel rim, A' a tire casing, B an ordinary inner tube and B' a sheet of strong, pliable material, for example, properly treated leather, rubber and canvas, or the like, provided at two opposite margins with means whereby it may be drawn into intimate contact with the surface of the outer side of a tire. For illustration, the sheet is shown as provided with marginal perforations reinforced by eyelets C to receive a lacing strip D passing, from one perforated margin to the other, around the rim. Through the intermediate portion of the sheet pass numerous stout rivet-like studs, preferably of soft steel, having on the outer face of the sheet very broad preferably conical heads or plates E. Each stud is passed through the tread portion, provided with a thin washer F, and upset to form a somewhat sharply pointed projecting end G the base of which is spread out upon the surrounding portion of the washer, which like the head E, is forced into the face of the sheet, the washer preferably being made flush with the surface of the sheet.

In applying the repair for a cut or puncture as at H, for example, the tire is more or less completely deflated, the cut is closed so far as it can be readily, and the sheet, with or without cement upon its inner face, is laced in position as in Fig. 1. The tire being then inflated to full working pressure, all the points G enter its outer surface, effectually preventing opening of the cut, and the sheet is drawn into intimate contact with the tire's outer surface. The puncture or cut is thus securely closed, relative movement of the sheet and tire or casing is fully prevented, and the wear of contact with the roadway is principally upon the broad heads of the studs, so that the repair usually lasts as long as the other portions of the tire.

It may be observed that the repair may be quickly made by unskilled persons without the aid of any tools or appliances, and that usually several of these sheets, of different widths, are carried, with suitable lacing strips, ready for use.

What I claim is:

In devices of the class described, the combination with a tough, pliable sheet having lacing apertures in two opposite margins, of a series of spaced rivet-like studs passing through the sheet provided with external broad, conical heads, with internal countersunk washers, and with smaller projecting pointed inner end portions upset to hold said washers flush with the inner face of the sheet, and a lacing strip for passing through said apertures and around the wheel rim whereby the sheet may be drawn firmly against the tire and its many points be forced into engagement with the tire on all sides of any rupture over which the sheet may be placed.

In testimony whereof I affix my signature in presence of two witnesses.

CHARLES FRANCIS JENKINS.

Witnesses:
 JAMES L. CRAWFORD,
 ROBERT CRAIG GREENE.